UNITED STATES PATENT OFFICE.

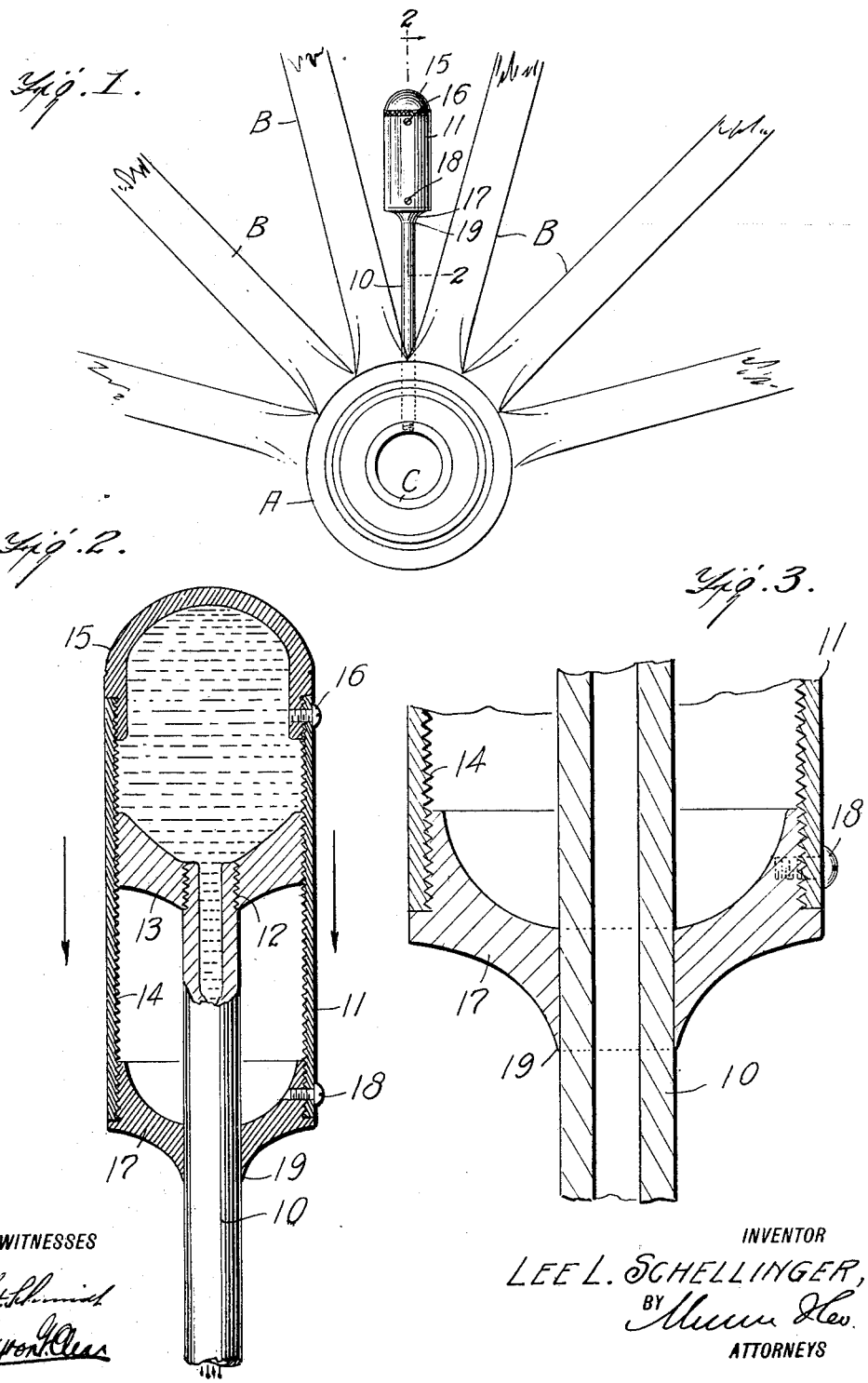

LEE L. SCHELLINGER, OF McGRAW, NEW YORK.

LUBRICATOR FOR VEHICLE-WHEELS.

1,244,248.  Specification of Letters Patent.  Patented Oct. 23, 1917.

Application filed January 12, 1917. Serial No. 141,965.

*To all whom it may concern:*

Be it known that I, LEE L. SCHELLINGER, a citizen of the United States, and a resident of McGraw, in the county of Cortland and State of New York, have invented a certain new and useful Improvement in Lubricators for Vehicle-Wheels, of which the following is a specification.

My present invention relates generally to lubricators, and more particularly to lubricators for wagon wheels and wheels of other vehicles, particularly heavy vehicles, my object being to provide a simple, inexpensive, and durable arrangement, the construction of which adapts it for use under all conditions, and is such as to bring about the advantages which I will presently describe.

In the following description of my improvement reference is made to the accompanying drawing forming a part of this specification, and wherein—

Figure 1 is a side elevation illustrating the practical application of my invention;

Fig. 2 is a vertical section on an enlarged scale, taken substantially on line 2—2 of Fig. 1, and Fig. 3 is another enlarged section through a portion thereof.

Referring now to these figures, my invention contemplates the provision of a lubricator including an elongated hollow feed stem 10, for extension through a conformable opening in the wheel hub A radially thereof, at a point between the inner ends of certain of the spokes B, the inner end of the said stem being threaded into the hub sleeve C so as to open onto the axle spindle extending through the sleeve C in use of the wheel.

The hollow feed stem 10 is open at its upper outer end also, as seen in Fig. 2, within the cylindrical barrel 11 of the lubricant holder, and is there threaded at 12 into a plunger 13 of considerably greater diameter than the tube 10, and having its annular face threaded for engagement with the internally threaded surface 14 of the barrel 11, so as to thus cause relative longitudinal movement of the plunger 13 with respect to the barrel, when the latter is rotated with respect to the said plunger and the stem 10, the threaded connection of the plunger and barrel thus dispensing with threads upon the stem 10, in order to permit of a smooth unbroken cylindrical stem of one diameter throughout at least the major portion of its length, as shown.

The outer end of the barrel 11 of the lubricant holder is closed by a cap 15 threaded thereinto and held against accidental displacement by a set screw 16, the inner end of the barrel 11 being similarly closed by a collar 17 also threaded therein and held against displacement by a set screw 18, and through which the feed stem 10 passes, the lower outer surface of which collar being in the form of a concaved cone with its central lowermost portion immediately around the stem 10 drawn to a relatively sharp edge 19 in snugly fitting sliding engagement with the said stem, so as to act as a cutter upon the surface of the latter as the barrel 11 moves down thereon in each rotative feed movement.

In operation, with the barrel at its outermost position, the cap 15 is removed and the space within the barrel above the plunger 15 is filled with lubricant of suitable nature, and the cap 15 again secured in position so that, upon rotative movement of the barrel 11 to cause its inward movement upon the stem 10, a portion of the lubricant will be forced through the tube 10 and onto the axle spindle within the hub sleeve C.

In the practical use of a device of this nature, it is obvious that the external surface of its stem 10 is exposed to incrustations by mud, ice, and other matter which would, in the absence of the cutting edge 19, seriously obstruct, if not absolutely prevent, movement of the holder downwardly thereon. As my invention is constructed, however, the collar 17 with its lower surface of the shape described, and with its cutting edge 19, operates to remove the said incrustations at each successive feed movement of the holder, so as to thus permit of ready operation of the lubricator under conditions which preclude the operation of those now in use, and considerably prolong its life.

I claim:—

1. A lubricator of the character described consisting of a stationary hollow feed stem, a lubricant holder including a cylindrical barrel into which the outer end of the stem projects, a plunger to which the said outer end of the stem is secured within the barrel and through which the said end of the stem opens, said plunger and said barrel having relatively engaging threaded surfaces, a removable cap normally closing one end of the said barrel, and a removable collar normally closing the opposite end of the barrel and through which the said stem passes, said collar having an outer cutting edge in close movable engagement with the outer surface of the stem.

2. In a lubricator of the character described, the combination of a hollow feed stem, a holder movable thereon at one end, said stem having a smooth outer cylindrical surface of one diameter throughout its portion adjacent the holder, and the said holder having a cutting edge projecting beyond its inner end and around the said stem in close movable engagement therewith.

3. In a lubricator of the character described, a holder, a stem projecting at one end within the holder and having an externally smooth cylindrical surface of one diameter throughout its portion adjacent the holder, a plunger threaded within the holder and to which the adjacent end of the stem is secured, said holder having a concaved cone-shaped collar at its inner end surrounding the stem, and provided with an inner cutting edge in close sliding engagement with the stem.

LEE L. SCHELLINGER.